April 27, 1937.   W. S. GURTON ET AL   2,078,492
COMPENSATING DRAFT COUPLING FOR TRACTORS AND TRAILERS
Filed Jan. 29, 1936   2 Sheets-Sheet 1

Inventors:
William S. Gurton.
Joseph Plint.
Herman Nyberg.

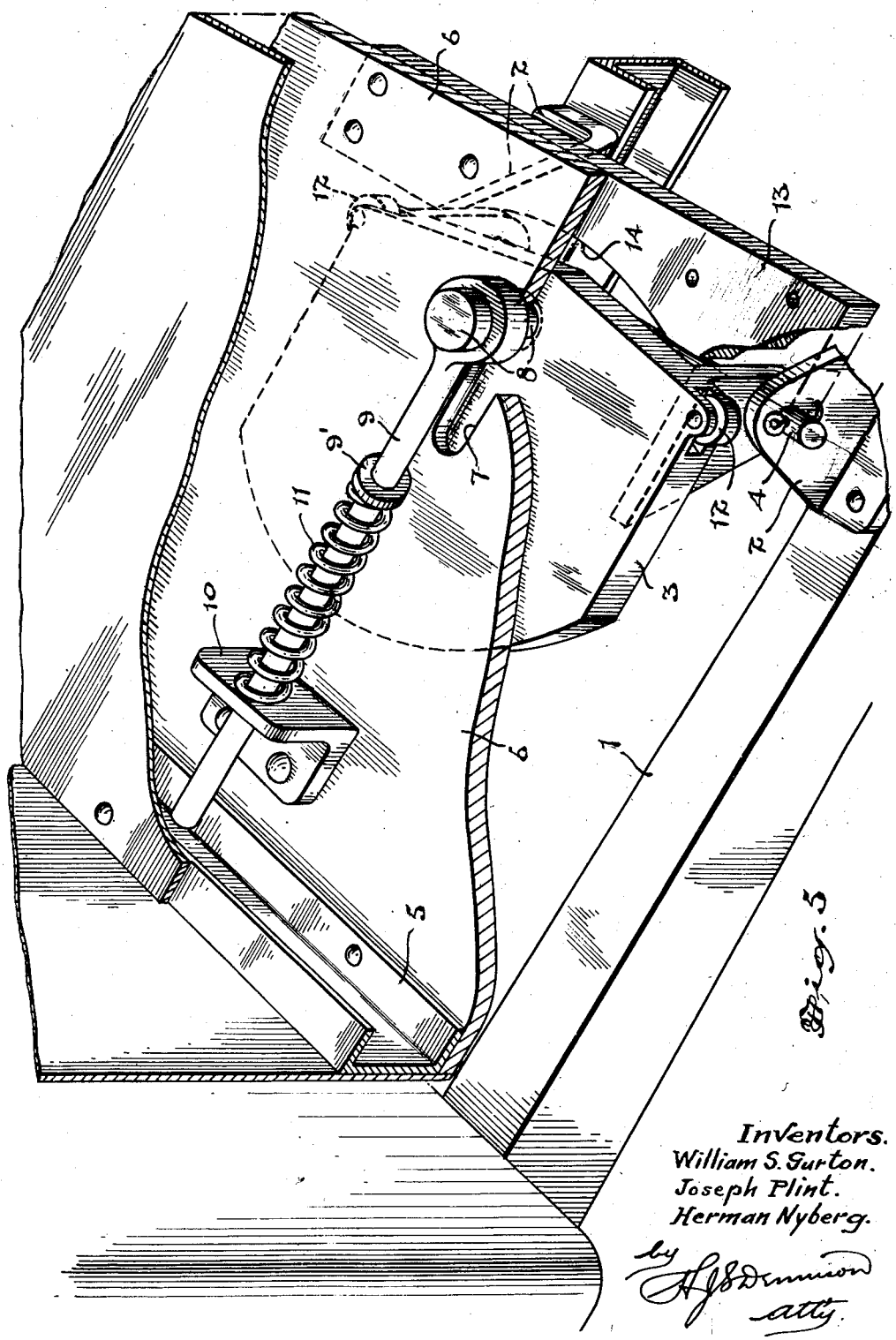

Patented Apr. 27, 1937

2,078,492

UNITED STATES PATENT OFFICE 2,078,492

COMPENSATING DRAFT COUPLING FOR TRACTORS AND TRAILERS

William S. Gurton, Joseph Plint, and Herman Nyberg, Kitchener, Ontario, Canada, assignors to Dominion Truck Equipment Co. Limited, Kitchener, Ontario, Canada Application January 29, 1936, Serial No. 61,298
In Canada February 25, 1935

9 Claims. (Cl. 280—33.1)

The principal object of this invention is to provide an improved form of automatic compensating coupling which will permit the close coupling of a tractor and trailer, and thereby minimize the overall length of the combination unit.

The principal features of the invention reside in the novel construction and arrangement of parts whereby the trailer unit and king pin are relatively displaced in a direction longitudinally of the trailer by the engagement of co-operating thrust members of the respective units on the turning of one unit relative to the other.

In the drawings Figure 1 is a side elevational part sectional view of a portion of a truck and trailer unit illustrating the present invention applied thereto.

Figure 5 is an isometric view, partly in section, drawn to an enlarged scale, showing the assembled coupling.

Figure 1:
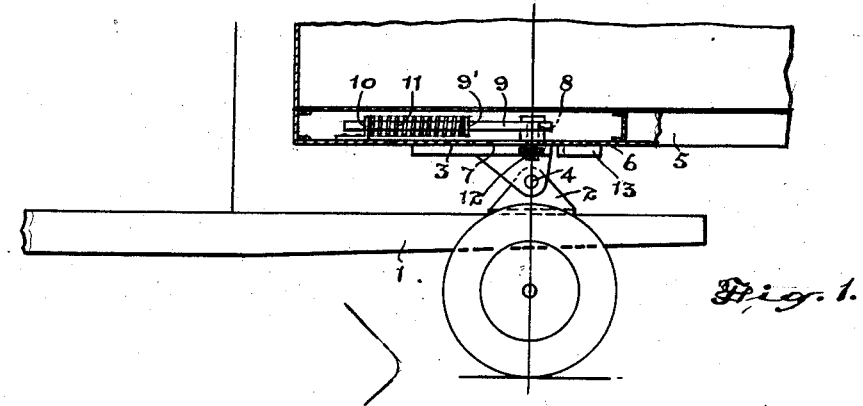

In our earlier United States Patent for Compensating couplings, No. 1,995,920, dated March 26, 1935, there is disclosed a form of compensating draft coupling which provides for the automatic spacing of the tractor and trailer units on turning of one relative to the other.

The present invention has been devised to provide an improved form of structure for this purpose.

In accordance with the structure herein shown by way of illustration, the tractor frame 1 is shown provided with laterally spaced upstanding hinge brackets 2, and a fifth wheel plate member 3 is hinged to the brackets 2 and 4, so that it swings only on a horizontal pivot in relation to the tractor frame and must turn in lateral directions in unison with the said tractor. The forward end of the trailer frame 5 carries a turning plate or the equivalent 6 which rests in turning contact on the upper surface of the fifth wheel plate 3, the plate 6 being provided with a longitudinally extending slot 7 arranged on the centre line of the trailer.

The king pin bolt 8 is suitably secured to the tractor plate 3 preferably at a point where its axis intersects the horizontal tilting axis 4, and the said king pin extends upwardly through the slot 7 of the plate 6 in guiding contact with the side walls thereof.

A thrust bar 9 pivotally encircles the king pin bolt and extends forwardly on the centre line of the trailer where it is slidably guided in a bracket 10, and a compression spring 11 encircles the thrust bar 9 and is compressed between the bracket and a collar 9' mounted on the member 9. The spring thus serves to resiliently hold the trailer unit in a forward position where it is in close-coupled relation to the rear wall of the cab of the tractor, such movement being limited by the engagement of the king pin with the rear extremity of the slot 7, or other suitable stop means.

Figure 2:
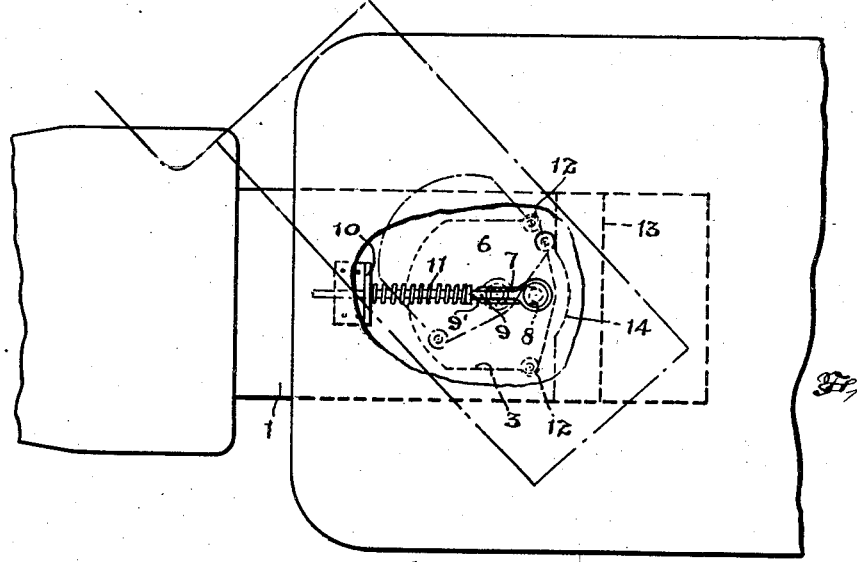
Figure 2 is a somewhat diagrammatic plan view partly in section showing in full line the arrangement of the coupling and thrust element with the tractor and trailer units in alignment, and illustrating in broken lines the relative disposition of the coupling and thrust elements when the tractor has assumed an angular position in turning.

It will be further observed that the draft connection between the tractor and trailer will be transmitted as a resilient thrust through the king pin 8, member 9 and spring 11 to the trailer bracket 10. Thrust rollers 12 are mounted on the outer rear corners of the turning plate 3, and a transversely arranged cam track 13 secured on the trailer frame, is arranged to be engaged by the rollers 12 after the tractor has turned a predetermined distance to either side of the longitudinal centre line of the trailer, and on further turning of the tractor, a fulcruming action will be set up between the contacting roller 12 and the cam track 13, so that the king pin will be positively forced forwardly in the slot 7 in opposition to the spring element 11, so that in effect, the trailer unit is automatically forced rearwardly relative to the tractor to increase the relative spacing thereof, and thereby provide adequate turning clearance between the respective units as indicated in Figure 2.

The cam track 13 provides a cam surface which preferably retreats rearwardly intermediate of its length as indicated at 14, so that after the tractor has turned a predetermined degree to substantially clear the corner of the trailer, and as the tractor is turned further the contacting roller 12 will simply roll on the contour 14 which is preferably such that at this point it is concentric with the displaced king pin bolt and a direct turning action is had between the two units.

Figures 3, 4:
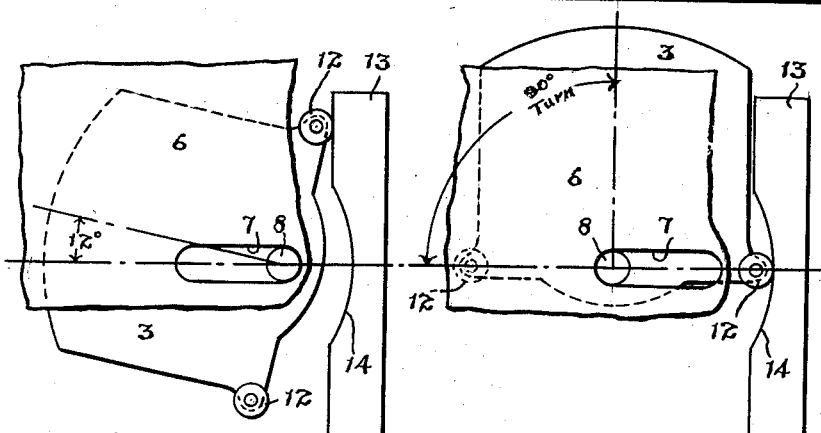
Figure 3 is a diagrammatic plan view on an enlarged scale showing the thrust members about to engage after a limited turning movement of the tractor.
Figure 4 is a view similar to Figure 3, but showing the relation of the thrust elements after the tractor has been turned to a 90° angle relative to the trailer.

It will be noted that by arranging the parts so that the tractor may turn a slight amount, say 12°, as indicated in Figure 3 before the roller 12 engages the track 13 that the said rollers 12 will normally be out of contact with the trackway 13 avoiding excessive wear thereon and on the associated parts and detrimental bumping contact.

What we claim as our invention is:—

1. The combination with a tractor and trailer, of a compensating draft coupling therefor, said coupling including means presenting rolling thrust contact between said respective units to space the same on the turning of one unit relative to the other, and means normally preventing thrust contact of said means until the tractor has turned beyond a predetermined degree out of alignment with the trailer to thereby avoid excessive wear on the mechanism.

2. The combination with tractor and trailer, units of a compensating draft coupling therefor including a king pin mounted for fore and aft displacement only on one of said units and confined against lateral displacement on the other of said units, a thrust member carried by one of said units, and roller thrust means carried by the other of said units and engageable in rolling thrust contact with the said thrust member on the turning of one unit relative to the other to effect relative fore and aft displacement of the king pin and first-mentioned unit to relatively space said units and provide turning clearance therefore.

3. The combination with tractor and trailer, units of a compensating draft coupling therefor comprising a king pin mounted on the tractor with its axis confined permanently on the centre line thereof and displaceably associated with said trailer, and means presenting rolling thrust contact between said tractor and trailer to displace said king pin relative to the trailer on the turning of one unit relative to the other including thrust rollers having a permanently fixed spaced relation to said king pin, said rolling thrust contact means presenting contact surfaces normally spaced clear of each other and engageable in thrust contact only after one unit has turned beyond a predetermined point relative to the other unit, whereby excessive wear on the compensating mechanism is obviated.

4. The combination with a tractor and trailer, of compensating draft means including a king pin therefor, said means presenting a displaceable turning pivot connection between said tractor and trailer and co-operative displacement control means for said pivot carried respectively by said tractor and trailer, means co-operative with said king pin for maintaining said control means normally out of co-operation when said units are travelling in a straight line and adapted to permit co-operation thereof only after one of said units has turned relative to the other a predetermined degree to effect the displacement of said turning connection and provide turning clearance for said units and whereby the compensating mechanism is normally relieved of wear and strain.

5. The combination with tractor and trailer units of a compensating draft coupling means therefor, said means including a displaceable turning connection, and thrust means effective to displace said turning pivot connection during a portion only of the swing of the tractor from a straight line position to a right angular position including inter-engageable contact portions normally spaced clear of engagement and adapted to engage in thrust contact only after predetermined relative turning displacement of said units.

6. Means as claimed in claim 5 in which said thrust means includes a thrust roller on the tractor and a transversely arranged cam track on the trailer formed with an intermediate cam recess presenting a surface which is concentric with the turning pivot after the latter has been displaced its maximum distance.

7. In a compensating draft coupling for a tractor and trailer combination, a king pin, a guide slot disposed longitudinally of the trailer and slidably receiving the king pin, thrust means co-operative with the king pin on the relative turning of said tractor and trailer to displace said king pin forwardly in said slot, spring means urging said king pin rearwardly in the slot, and means limiting the rearward displacement of the king pin to maintain said respective parts of the thrust means normally out of co-operation with the king pin.

8. Means as claimed in claim 7 in which a rod pivoted axially of the king pin extends radially therefrom and is slidably supported in a bracket carried by the trailer, said spring means being mounted on the rod and exerting oppositional forces on the bracket and rod.

9. The combination with a tractor and trailer, of a compensating draft coupling therefor comprising a fifth wheel plate horizontally hinged to the tractor and constrained to turn in lateral directions therewith and on which the forward end of the trailer rests in bearing contact, means forming a displaceable turning pivot connection between said fifth wheel plate and the trailer, and means presenting rolling thrust contact between said fifth wheel plate and trailer to effect the variable displacement of said turning connection on the turning of one unit relative to the other, said roller thrust means comprising rollers mounted at the rear outer sides of said fifth wheel plate for rolling thrust contact with a transversely arranged trackway, said rollers and turning connection being disposed in a substantially common vertical plane.

WILLIAM S. GURTON.
JOSEPH PLINT.
HERMAN NYBERG.